J. C. BERTSCH.
PROCESS OF AND APPARATUS FOR REFRIGERATION.
APPLICATION FILED JAN. 26, 1917.

1,265,037.

Patented May 7, 1918.
3 SHEETS—SHEET 1.

"Old System."

INVENTOR.
John C. Bertsch
BY
HIS ATTORNEY

J. C. BERTSCH.
PROCESS OF AND APPARATUS FOR REFRIGERATION.
APPLICATION FILED JAN. 26, 1917.

1,265,037.

Patented May 7, 1918.
3 SHEETS—SHEET 2.

INVENTOR.
John C Bertsch
BY
HIS ATTORNEY

J. C. BERTSCH.
PROCESS OF AND APPARATUS FOR REFRIGERATION.
APPLICATION FILED JAN. 26, 1917.
1,265,037.
Patented May 7, 1918.
3 SHEETS—SHEET 3.
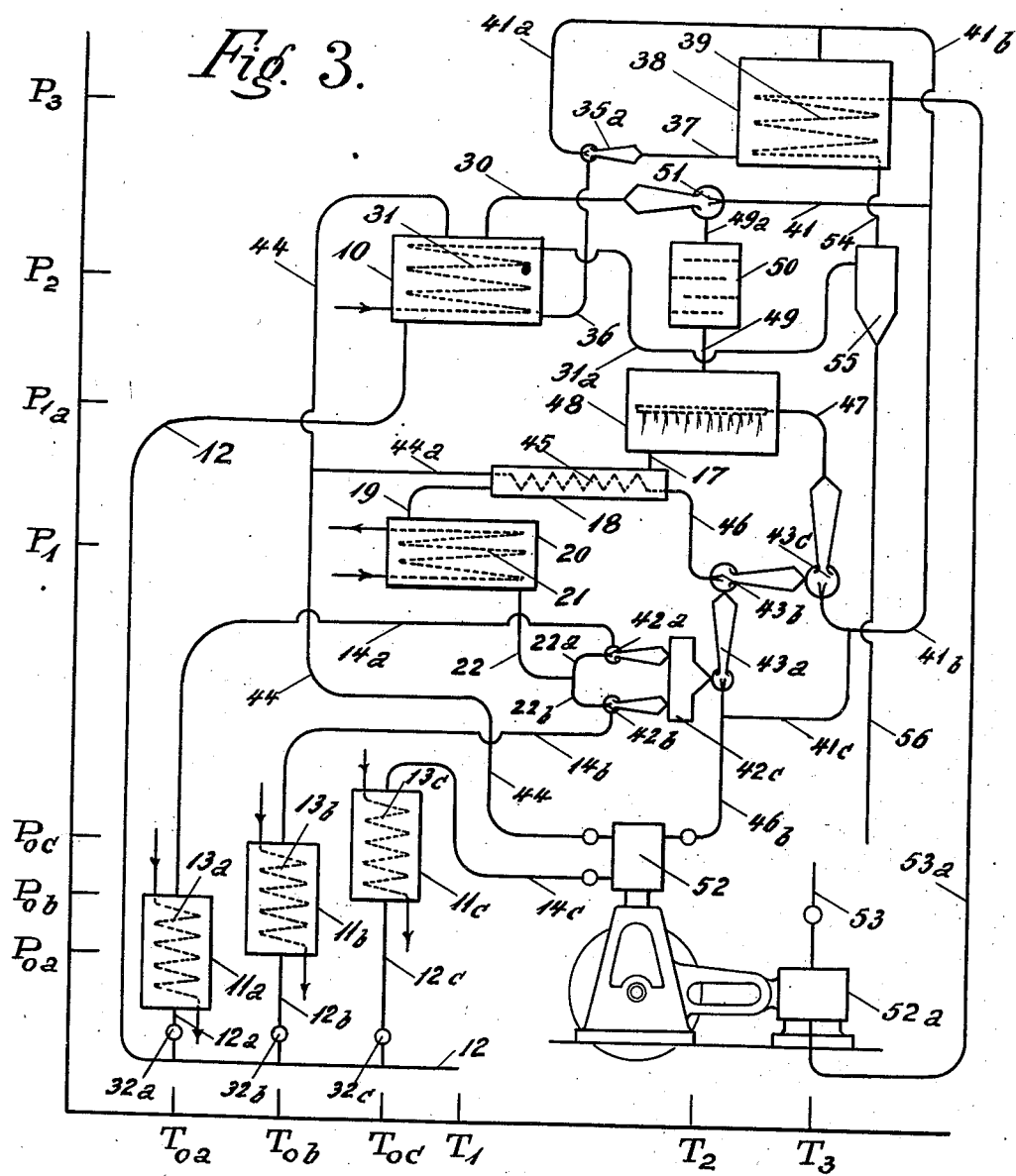

UNITED STATES PATENT OFFICE.

JOHN C. BERTSCH, OF EDGEWOOD PARK, PENNSYLVANIA.

PROCESS OF AND APPARATUS FOR REFRIGERATION.

1,265,037.  Specification of Letters Patent.  Patented May 7, 1918.

Application filed January 26, 1917. Serial No. 144,624.

*To all whom it may concern:*

Be it known that I, JOHN C. BERTSCH, a citizen of the United States, residing at Edgewood Park, in the county of Allegheny and State of Pennsylvania, have invented certain new and useful Improvements in Processes of and Apparatus for Refrigeration, of which the following is a specification.

My invention relates to improvements in processes of, and apparatus for effecting refrigeration by the alternate expansion from liquid to vapor or gas, and condensation of vapor or gas to liquid, of a refrigerating agent, hereafter called "fluid", which is absorbable in a liquid having a much higher boiling point than the fluid, such for example as ammonia, sulfur dioxid, acetone, and the like, which are absorbable in water, or carbon disulfid, chloroform, ethyl chlorid, carbon tetrachlorid, and the like, which are absorbable in oil, the mixture of fluid and absorbent being called "liquor".

My invention comprises a combined absorption and compression system in which the expanded fluid is absorbed by a jet or jets of a weak liquor, and in which the rich liquor so formed, and also the gas liberated from the latter, are compressed by jets of superheated fluid gas.

My invention also consists of the generation of motive fluid, for operating jet apparatus, by vaporizing liquid, and superheating fluid gas, by waste heat, such for example as atmospheric exhaust steam, furnace gases, exhaust gases from internal combustion engines, weak liquor, or the like, including the neutralization or purification of the fluid while in circulation.

My invention further consists of a novel combination of an absorption and compression system of refrigeration, in which the heat of absorption, augmented by the heat of the motive fluid, is utilized for dissociating the fluid from the absorbent; the concentration of the weak and rich liquor is made independent of the pressures in the condenser and evaporator, respectively, and in which cooling water of a relatively high temperature can be used in the condenser, besides eliminating the use of cooling water in the absorber.

By so doing I effect notable economies over the old refrigerating systems, in which steam at pressures above that of the atmosphere must be used. The use of cooling water of a relatively high temperature is of great importance, particularly with the use of cooling towers from which the water returns at temperatures which make the production of low temperatures with the present absorption systems impractical.

My invention furthermore consists of a novel combination of jet apparatus with either the plain absorption, plain compression, or with combinations of both of them, for the economical operation of several evaporators at different temperatures, including the use of multi-stage jet-absorbers.

My invention consists of other features hereinafter described and particularly pointed out in claims.

The objects of my invention are an increased economy in processes of and apparatus for effecting refrigeration; the utilization of waste heat for generating motive fluid; the concentration of liquors independent of the pressures in the evaporator and condenser; the utilization of the heat of absorption and that of the motive fluid for the dissociation of fluid and absorbent; the continuous purification of the fluid in circulation; the use of condensing water of a relatively high temperature, and combinations of apparatus which, while accomplishing the above objects, are simple, compact, and easily operated.

I will now proceed to describe my invention, first with reference to the systems heretofore proposed, then with reference to the accompanying drawings, and finally with pointing out the novel features in claims. The *modus operandi* being substantially the same for all absorbable fluids, I will describe my invention with the use of ammonia as the most widely known fluid. However, I will not attempt to describe or illustrate in detail the constructive, regulating and auxiliary parts of a system which have no bearing upon my invention, limiting myself to a representation of the principal parts comprising a refrigerating system.

The present types of absorption apparatus consists mainly of the evaporator, absorber, weak liquor cooler, aqua pump, heat exchanger, the still and the condenser, all parts being substantially the same in a combination absorption-compression apparatus, with the addition of a compression machine.

The liquid fluid, flowing from the condenser into the evaporator, is vaporized in the latter by the heat of the substance to be cooled.

The fluid vapor is then either compressed by the compressor and discharged into the condenser, or absorbed in the absorber by the cooled weak liquor coming from the still, and the rich liquor thus formed, is delivered into the still by the aqua pump. The hot weak liquor and the cold rich liquor flow in counter current through the heat exchanger and upon entering the still the rich liquor is heated by steam for driving out the ammonia gas, which flows into the condenser for being liquefied and fed into the evaporator, as in the beginning, whereas the weak liquor, after passing through the heat exchanger, is cooled in the weak liquor cooler for repeating its function in the absorber. In combination absorption-compression systems, the still of the former is operated by the exhaust steam of the latter, at steam pressures of from 5 to 30 lbs. gage.

By reason of the physical and caloric properties of fluid solutions, the pressure, temperature and concentration of a liquor are in fixed relations to each other.

As the same pressure exists in the still and condenser, the concentration of the weak liquor is dependent upon the quality and temperature of the condensing water, and the higher the temperature of the latter, the higher is the concentration of the weak liquor, and the smaller its absorbing power in the absorber. Likewise, the evaporator and absorber pressures being the same, the concentration of the rich liquor depends upon the temperature in the evaporator, and the lower the latter, the lower is the concentration of the rich liquor, and the greater the steam pressure required for dissociating the gas from the absorbent in the still.

But the refrigerating effect and economy of a system are directly proportional to the difference in the concentration of the weak and rich liquor, wherefore it is desirable to obtain the highest concentrations for the rich and the lowest for the weak liquor. With the present absorption systems this is only possible by using large quantities of condensing water of a relatively low temperature while working the evaporator with a relatively high temperature. But as in most practical cases the working conditions are just reversed, large quantities of steam of a relatively high pressure are required and therefore the economy greatly reduced, as the steam consumption represents the greater part of the total operating expense.

Even in combination absorption-compression systems the economy is greatly impaired by the relatively higher steam pressures required, as an increase in pressure over and above that of the atmosphere of the exhaust steam from the engine of the compression machine simply increases the water rate for the engine working with high pressure steam.

Now, according to my invention, I use only waste heat which is available at no expense. I operate the evaporator, or any number of them, at whatever pressure desirable, and aspirate the vapor from them by jets of weak liquor which has been previously cooled, thus forming the rich liquor which is instantly compressed and forced into the still by jets of superheated gas, substantially in the same manner as a boiler is fed by an injector.

The absorber and aqua pump, as heretofore employed, are therefore eliminated, the power required for the latter saved, and the heat of absorption retained instead of wasted as in the old absorption systems.

Instead of heating the rich liquor by passing same through the heat exchanger, as heretofore practised, I use the latter for superheating fluid gas from the condenser with the hot weak liquor from the still, passing both in counter current, whereby the temperature of the weak liquor is lowered before entering the weak liquor cooler.

The heat of absorption, together with the heat of the motive fluid operating the jet apparatus, I utilize for separating the greater part of the gas from the highly over-charged rich liquor entering the still, and if required, I augment this heat combination with superheated fluid gas. By doing so I can dispense with the steam coils in the still, and transforming the latter to a simple gas separator, I keep its pressure below that of the condenser by aspirating the liberated gas with jet apparatus, operated by high pressure motive fluid, from the separator and delivering same into the condenser, thereby making the concentration of the weak liquor independent of the condenser pressure.

I am fully aware, that the aspiration of the vapor from the evaporator by the force of the weak liquor has been proposed heretofore for accelerating the flow of the vapor. But my invention distinguishes clearly from this earlier method by delivering the rich liquor directly into the separator by the combined velocity of the weak liquor and motive fluid. According to my invention, the jet-absorber may also be operated by the gas discharged from compression machines, without increasing the power for the latter, and for overcoming excessive pressures or for supplying greater amounts of heat to the separator, the jet-absorber may be operated in multi-stages.

Other parts, not in common with the old types of absorption apparatus, but essential for carrying out my improved process, are the "fluid heater" and the "fluid purifier".

The former is the only part to which heat from outside sources is applied for generating high pressure motive fluid, by vaporizing liquid fluid with waste heat. The liquid at condenser pressure is fed into the fluid heater either by injection, as in a boiler, or by a pump driven by a turbine in which the potential energy of the liquid to be expanded in the evaporator or evaporators is converted into and used as kinetic energy, whereby the loss of heat due to throttling in an expansion valve is prevented. This high pressure motive fluid is used primarily for forcing the liberated gas from the separator into the condenser, but may be used to advantage for operating jet apparatus in connection with other systems, such as the plain compression, or the plain absorption system, or combinations of them, and also in connection with my improved process of refrigeration for which I have made application for Letter Patent, Serial No. 51207, filed Sept. 17, 1915.

The alternate heating and cooling of the fluid as required for carrying out my invention, may cause the formation of non-condensable gases or other impurities which must be constantly absorbed or neutralized for which purpose I employ the "fluid purifier", which is charged with suitable reagents through which the fluid in gaseous or in liquid form, depending upon the character of the fluid used, is passed while circulating through the system.

The economy and advantages of the combination of an ammonia absorption with a compression system have long been demonstrated, but according to my invention they are materially increased by using the exhaust steam from the compressor engine for generating high pressure motive fluid, instead of heating the liquor in the still, as heretofore practised.

By this older method, fluid and absorbent must be heated, and as the latter has a much higher boiling point than the fluid, steam of a relatively high pressure is required. According to my invention, the fluid alone is heated, and as a temperature of about 150° F. is sufficient for generating a fluid pressure of about 400 lbs. gage, as suitable for operating jet apparatus, the fluid heater may be used as a part of a steam condenser, for the compressor engine, the other part of such steam condenser being supplied with the water used first over the fluid condenser, thereby operating the engine with a vacuum of from 15 to 20 inches of mercury instead of with pressures of from 5 to 30 lbs. gage, as heretofore. Of course, an additional quantity of condensing water is required for condensing the high pressure motive fluid, but the expense for this is greatly overbalanced by the saving of steam and by the use of condensing water of a relatively high temperature without in the least affecting the concentration of the weak liquor in the gas separator.

It must be understood that my improved process of refrigeration, for itself or in combination with other systems, can be carried out with heat from any source, whatever, and if waste heat is not available or the use of same not desired, steam of any pressure, or heat generated by any kind of fuel, or electricity, may be substituted for waste heat, without in the least departing from the spirit and scope of my invention.

In the drawings:—

Fig. 3 is a diagrammatical view of a combination absorption-compression system, showing the embodiment of my invention with several evaporators multi-stage jet absorbers on the P T diagram as in Fig. 1.

Figure 1:
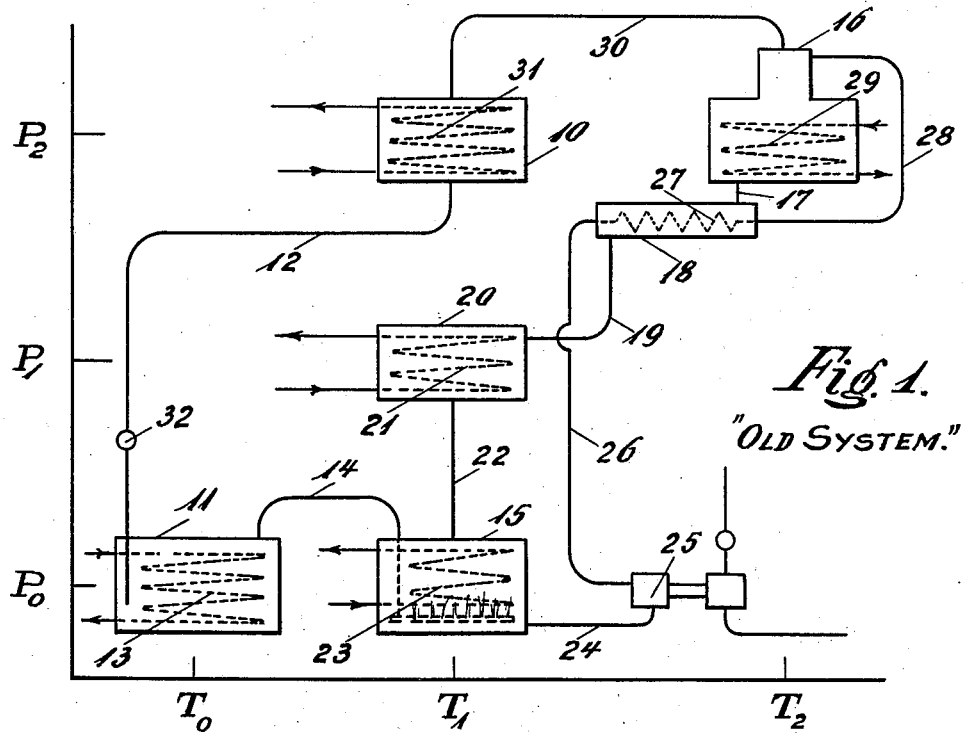
Figure 1 is a diagrammatical view of an absorption system as practised heretofore, showing the principal parts on the P T diagram, in which parts of substantially the same pressure are located horizontally side by side, parts of higher pressure are located above parts of a lower pressure, and parts of a higher temperature are located to the right of parts of lower temperature.

Figs. 4, 5, 6, 7 and 8 are diagrams showing the possible changes in the properties of fluid solutions, in which rectangular areas designate "constant", and right angle triangular areas designate "increase" when read in the direction toward the right angle, and "decrease" when read in the direction toward the smaller of the acute angles, P designating pressure, T designating temperature and C designating concentration of the liquor, dotted center lines $x$—$x$ indicating normal conditions.

From condenser 10, which may be of any known construction and consisting of one or more sections connected either in parallel or in series, the liquid fluid flows to evaporators 11, 11$^a$, 11$^b$ and 11$^c$ through pipes 12, 12$^a$, 12$^b$ and 12$^c$ respectively, for cooling the substance circulating through coils 13, 13$^a$, 13$^b$ and 13$^c$ in the usual well known manner. In the old absorption system, Fig. 1, the vapor passes through pipe 14 into the absorber 15, where it is absorbed by the weak liquor coming from the still 16 through the pipe 17, which, after passing heat exchanger 18 and pipe 19, is cooled in the weak liquor cooler 20, by the water flowing through coil 21 before entering the absorber through pipe 22.

Figure 5:
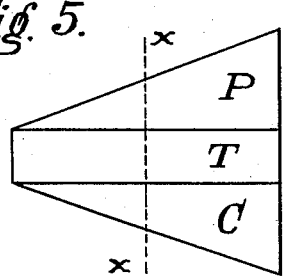
Figure 6:
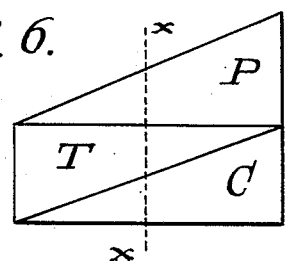

During absorption, heat is set free, and to prevent a rise in the temperature, in the absorber, the same is provided with cooling coil 23 through which water is circulated, thereby keeping T constant, as shown in Fig. 5, which also shows the proportional change of P and C.

Figure 4:
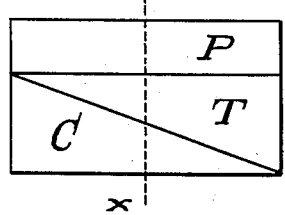

The absorber pressure, being due to the temperature in the evaporator, is constant for certain working conditions, and as shown by Fig. 4, an increase of T would decrease C, and vice-versa, wherefore it is desirable to lower T in order to increase C, the concentration of the rich liquor, which flows through pipe 24 to aqua pump 25, being delivered by the latter through pipe 26, heat exchanger coil 27 and pipe 28 into the still 16, in which the pressure, due to the temperature in the condenser, is also constant, as shown by Fig. 4. The rich liquor entering the still with a relatively high C and low T, is heated, for dissociating the fluid gas from the absorbent, by a steam coil 29, the gas passing through pipe 30 into the condenser 10 for being liquefied by the cooling action of the condensing water flowing through coil 31, and the weak liquor leaving the still by pipe 17 as stated in the beginning.

Figure 2:
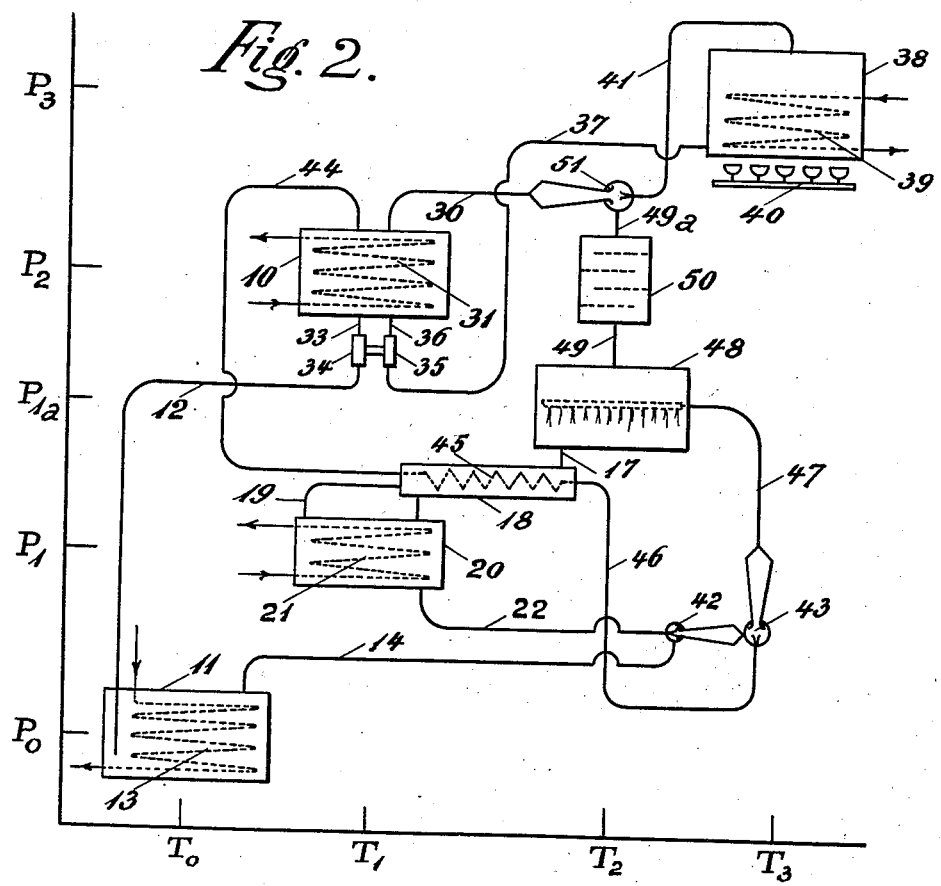
Fig. 2 is a diagrammatical view of an absorption system embodying my invention, showing the principal parts on the P T diagram as in Fig. 1.

For regulating the flow of the liquid fluid as required for the desired pressure in the evaporator, the liquid pipes 12, 12$^a$, 12$^b$ and 12$^c$ are provided with expansion valves 32, 32$^a$, 32$^b$ and 32$^c$, respectively, as shown by Figs. 1 and 3. A more economical way of lowering the liquid fluid from the temperature in the condenser to that in the evaporator is shown by Fig. 2. The liquid fluid flows from condenser 10 through pipe 33 into a liquid motor 34, which drives a liquid pump 35, thereby lowering the temperature of the liquid fluid to that in the evaporator by performing work, instead of carrying the heat equivalent to the work performed, into the evaporator. The pump receives liquid fluid from condenser 10 through suction pipe 36, and discharges the same through pipe 37 into the fluid heater 38, in which it is vaporized at a pressure much above that in the condenser, by waste heat applied either internally, as indicated by coil 39, or externally as indicated by furnace 40.

The liquid fluid may also be fed into the fluid heater by a jet-pump or injector 35$^a$, shown in Fig. 3, supplied with high pressure motive fluid through pipe 41$^a$.

According to my invention, the vapor from the evaporator is absorbed in a jet apparatus comprising a jet absorber 42 and a jet compressor 43, as in Fig. 2, or jet absorbers 42$^a$ and 42$^b$, connected with a receiver 42$^c$, and jet compressors 43$^a$, 43$^b$ and 43$^c$, shown in Fig. 3 and working in multi-stages. The jet absorbers are operated by weak liquid supplied through pipes 22, 22$^a$, and 22$^b$, the vapor from the evaporators being supplied by pipes 14$^a$ and 14$^b$, respectively.

Figure 7:
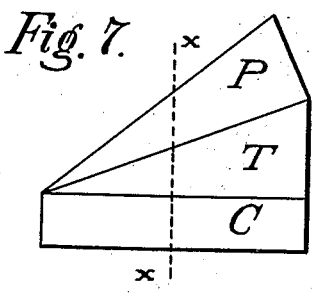
Figure 8:
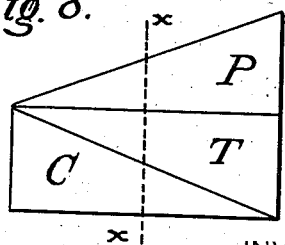

Figs. 7 and 8 show the changes which take place in the combination jet apparatus. Reaching the jet absorbers at a relatively low C and high P and T, as to the extreme right of Fig. 8, the weak liquor attains a high velocity while issuing in small jets, caused by a drop in P and T, as in a counter clockwise direction of Fig. 8. Being of a low C, it absorbs readily the vapor aspirated from the evaporators, thus forming the rich liquor, as in Fig. 7. The heat of absorption increases T, which must be balanced by increasing P in order to maintain relations as in a clockwise direction of Fig. 7 while the weak liquor jets possess their velocity. In Fig. 2, I accomplish this by discharging the rich liquor into the jet compressor 43, operated with fluid gas passing from condenser 10 through pipe 44 and coil 45 within heat exchanger 18, in which it is superheated by the hot weak liquor, entering the jet compressor 43 through pipe 46. The superheated fluid gas is expanded substantially adiabatic to a relatively low pressure, in order to obtain jets of great velocity, which force the incoming stream of rich liquor through pipe 47 into separator 48.

The changes within the jet compressor take place in a clockwise direction of Fig. 8. P and T increase, but C cannot decrease, owing to the great velocity at which the liquor and gas are passing through the jet compressor until they enter separator 48 where the fluid gas is instantly liberated. Within separator 48, T is either kept constant as in Fig. 5, or it is increased by surplus superheated fluid gas, as in Fig. 6, while P is prevented from rising, as will be explained later, so that counter clockwise changes of Figs. 5 and 6 occur, resulting in a weak liquor of a relatively low concentration, as most suitable for a high refrigerating effect.

The pressure in the separator is kept below that in the condenser by aspirating the liberated gas from separator 48 through pipe 49, purifier 50 and pipe 49$^a$, by a jet compressor 51, which is operated by high pressure motive fluid supplied through pipe 41 and discharged into condenser 10 through pipe 30, as shown in Figs. 2 and 3.

The application of my invention to combinations of absorption systems with compression systems, as shown in Fig. 3, is substantially the same as shown in Fig. 2. The modifications required refer to the operation of several evaporators in connection with multi-stage jet absorption apparatus, including the operation of the fluid heater with the exhaust steam of the compressor engine.

Evaporators 11$^a$, 11$^b$ and 11$^c$ are operated at different temperatures, as indicated by $T_0a$, $T_0b$ and $T_0c$ of the P T diagram. A compression machine operates evaporator $11^c$ of the highest temperature, while $11^a$ and $11^b$ are operated by the absorption system in the manner described before. Owing to different temperatures, each evaporator requires a separate jet absorber $42^a$ and $42^b$, respectively, both discharge into a receiver $42^c$. Compressor 52 receives the vapor from evaporator $11^c$ through suction pipe $14^c$, compresses and discharges same either through pipe 44 or $46^b$, or in part through each of them at the same time, the former delivering the gas into condenser 10, and the latter into jet-compressor $43^a$. A branch pipe $44^a$ supplies jet-compressor $43^b$ with superheated fluid gas, which, after leaving main pipe 44 is superheated in coil 45 within heat exchanger 18, entering the jet-compressor through pipe 46. Jet compressor $43^c$ is supplied with high pressure motive fluid through pipe $41^b$, which connects by a by-pass $41^c$ with pipe $46^b$ for operating the multi-stage jet absorber-compressor $43^a$ while the compression machine 52 is not in operation, or when it is desired to operate both systems independently from each other.

The exhaust steam from engine $52^a$, which is supplied with high pressure steam through pipe 53, is passed through pipe $53^a$ into fluid-heater coil 39, which is provided with an outlet 54 connecting with a steam condenser 55. The latter is shown as a barometric condenser with tail pipe 56, but any other type of steam condenser may be used as well, the condensing water required being taken from condenser 10 through pipe $31^a$.

Considering only the easily condensable gases, exclusive of the substantially perfect gases, the laws pertaining to gases state, that the changes in the pressure and temperature of a saturated vapor are synonymous, whereas superheat changes only the temperature but not the pressure.

With liquors, in which a gas is absorbed or dissolved in a liquid, the ratio between the weight of gas and absorbent, or the concentration, is also effected by a change in either temperature or pressure, and it can be broadly stated, that in saturated liquors the change of either two properties are synonymous, whereas the third property may either remain constant or changes in an opposite sense to the other two, as illustrated in Figs. 5, 6, 7 and 8, Fig. 4 showing the only exception, with P constant and T and C changing in an opposite sense.

I make use of these laws in my invention, and more particularly in the extensive application of jet apparatus, the working of which is best illustrated by the P T diagram of Figs. 1, 2 and 3, which show the relative pressures and temperatures of the several parts of a system.

In referring to this diagram, I do not intend to be mathematically, but only substantially correct, as the diagram does not permit locating every part accurately at its proper pressure and temperature level.

A body falling adiabatically or nearly so, from a higher to a lower pressure, temperature or heat content level, gains in velocity, and upon being lifted in the same manner from a lower to a higher of said levels, it loses velocity. This expressed in more technical terms, means that during expansion the potential energy of a body is converted into kinetic energy and during compression the kinetic energy is reconverted into potential energy, which, briefly stated, is the process going on in a jet apparatus, of the character employed in my invention.

The weak liquor from separator 48 (Fig. 3) falls from $P_1a$ to $P_0$, entering at the latter level jet absorbers $42^a$ and $42^b$, and issuing within them in jets of a velocity due to the difference between $P_1a$ and $P_0$, thereby producing suction, aspirating and absorbing the vapor from evaporators $11^a$ and $11^b$, respectively, thus forming the rich liquor.

A part of said velocity is lost by friction, and another part is imparted to the fluid during absorption, so that only a relatively small part remains for delivering the rich liquor into receiver $42^c$ and from the latter into jet compressor $43^a$. But this remaining small velocity is immediately augmented by the aspirating action of jet compressor $43^a$, which is supplied with fluid gas at condenser pressure from the discharge of compression machine 52, issuing in jets of a velocity equal in magnitude to one due to a fall from $P_2$ to $P_0$, by which the rich liquor is fully saturated, partially compressed and discharged into jet compressor $43^b$, thus completing the first stage of compression, with a terminal pressure located somewhere between $P_0$ and $P_1$. In like manner jet compressor $43^b$ performs the second stage of compression with a fluid gas of a greater heat content than that used in jet compressor $43^a$, owing to the superheating in heat exchanger 18 of the gas from condenser 10, falling from $P_2$ to somewhere between $P_1$ and $P_0$, and entering jet compressor $43^b$ through pipe 46.

The final stage of compression is performed in jet compressor $43^c$, with motive fluid from fluid heater 38 through pipe $41^b$, working with a velocity due to a fall from $P_3$ to $P_2$, and delivering the rich liquor from jet compressor $43^c$ into separator 48 through pipe 47.

According to the pressures to be overcome, jet compressors $43^a$, $43^b$ and $43^c$ may all be operated with fluid gas from compressor 52 or from condenser 10, and instead of three stages, only one or any other number of stages may be employed, Fig. 3 being only illustrative of an arrangement in multi-stages, which may form integral parts of one unit instead of a number of interconnected parts.

In like manner jet compressor 51 may be arranged in multi-stages, according to the magnitude of heat drop from $P_3$ to $P_2$ and work to be performed. The arrangement of fluid heater 38 with steam condenser 55 is illustrative of operating steam engine 52 with a back pressure below that of the atmosphere, instead of one above the latter, as already described. But if it is desired to use exhaust steam of atmospheric pressure in coil 39, condenser 55 with tail pipe 56, or other steam condenser proposed, may be dispensed with and the water from condenser 10 through pipe 31ª be used in a fluid forecooler (not shown in drawing) for cooling the fluid gas before it reaches condenser 10.

Having fully described my invention, what I claim is:—

I claim:

1. A refrigerating apparatus comprising a condenser, an evaporator connected thereto, a jet absorber receiving vapor from the evaporator and weak liquor at superior pressure, a compressor receiving solution from said absorber, a separator into which the compressor delivers, a return connection for weak liquor from the separator to the absorber, and means for compressing the gas passing from the separator to the condenser.

2. In a refrigerating apparatus, the combination with a main circuit for the refrigerant from and to the condenser, said circuit including a jet compressor for delivering gaseous refrigerant to the condenser, of a heater in circuit with the condenser and supplying high pressure gas to said compressor.

3. In a refrigerating apparatus, the combination with a main circuit for the refrigerant from and to the condenser, said circuit including a jet compressor for delivering gaseous refrigerant to the condenser, of a heater in circuit with the condenser and supplying high pressure gas to said compressor, and a pump in the heater circuit, driven by fluid circulating in the main circuit, for forcing fluid from the condenser to said heater.

4. In a refrigerating apparatus, the combination with a refrigerant circuit including a condenser and an evaporator, of a jet absorber and a jet compressor in the return part of the circuit between the evaporator and the condenser, a gas and absorbent separator between the compressor and the condenser, provided with connections, adapted to return the separated liquor to the absorber and the gas to the condenser, means to cool said separated liquor and means to apply pressure to said separated gas.

5. In a refrigerating apparatus, the combination with a main circuit for the refrigerant, including a condenser and an evaporator, of a jet absorber and a jet compressor in the vapor circuit between the evaporator and the condenser, and means to supply said absorber with cooled weak absorbent liquid and said compressor with gas under pressure, from said circuit.

6. In a refrigerating apparatus, the combination with a main circuit for the refrigerant, including a condenser, and an evaporator, of a jet compressor in the return or vapor circuit between the evaporator and the condenser, a pressure gas connection from the condenser to said compressor, and means to heat the gas in said connection.

7. In a refrigerating apparatus, the combination with a main circuit for the refrigerant, including a condenser, and an evaporator, of a jet compressor in the return or vapor circuit between the evaporator and the condenser, a pressure gas connection from the condenser to said compressor, and means to heat the gas in said connection, comprising a gas and liquid separator between the compressor and the condenser, and a return connection for liquid from the separator to the main circuit, including a heat exchanger for heating the gas in said gas connection by means of said liquid.

8. In a refrigerating apparatus, the combination with a main circuit for refrigerant, including a condenser and an evaporator, of a branch circuit to the condenser, a heater in said branch circuit, for heating fluid therein, and means in the main circuit, actuated primarily by the heat supplied by said heater, to compress and circulate the refrigerant in the main circuit.

9. In a refrigerating apparatus, the combination with a main circuit for refrigerant, including a condenser and an evaporator, of a branch circuit to the condenser, a heater in said branch circuit, for heating fluid therein and means in the main circuit, actuated primarily by the heat supplied by said heater, to compress and circulate the refrigerant in the main circuit, said means including a jet compressor and a jet absorber.

10. In a refrigerating apparatus, the combination with a main circuit for refrigerant, including a condenser and an evaporator, of a branch circuit to the condenser, a heater in said branch circuit, for heating fluid therein, and means in the main circuit, actuated primarily by the heat supplied by said heater, to compress and circulate the refrigerant in the main circuit, and a pump in the branch circuit, to circulate fluid through the heater.

11. In a refrigerating apparatus, the combination with a main circuit for refrigerant, including a condenser and an evaporator, of an aspirator in the gas return between the evaporator and the condenser, and a heated branch circuit to the condenser, having an operating pressure discharge into the aspirator, to produce a flow of the return gas to the condenser.

12. In a refrigerating apparatus, the combination of a condenser, an evaporator, a jet absorber, a jet compressor, a separator, and a jet injector, all connected in series in a main fluid circuit, a heater, a branch connecting the heater and condenser and having an injecting discharge for high pressure gas into the injector, a circulating pump in said branch circuit, a liquid pipe from the separator to the absorber, a gas pipe from the condenser to the compressor, a heat exchanger between said pipes, for heating the gas by heat from the liquid, and a cooler for the liquid, between said heat exchanger and the absorber.

13. In a combined absorption and compression refrigerating apparatus, the combination with a main circuit for the refrigerant, including a condenser and a plurality of evaporators, of an absorber connected to one of the evaporators, a compressor connected to another of the evaporators, a common return line from the absorber and compressor to the condenser, and a separator in said return line, having a return liquor connection to the absorber.

14. In a refrigerating apparatus, the combination with a main circuit for the refrigerant, including a condenser and an evaporator, of multi-stage jet compressors in the return line from the evaporator to the condenser, and a heater circuit connected to the condenser and delivering heated fluid under pressure to said compressors.

15. In a refrigerating apparatus, the combination with a main circuit for the refrigerant, including a condenser and an evaporator, of multi-stage jet compressors in the return line from the evaporator to the condenser, a gas pressure line from the condenser to one of said compressors, a heater connected to the condenser, and gas pressure lines from said heater to other of the compressors.

16. In a refrigerating apparatus, the combination of a main circuit for the refrigerant, including a condenser and an evaporator, of a steam power appliance in the return from the evaporator to the condenser, multi-stage jet compressors between said steam power appliance and the condenser, a branch circuit connected to the condenser and to said compressors, a heater in said circuit, and an exhaust steam connection from said steam power appliance to the heater, to heat the contents of the latter.

17. In a refrigerating apparatus, the combination with a main circuit for fluid refrigerant, including a condenser and an evaporator, of a motor in the circuit between the condenser and evaporator, operated by the flow therein, a branch heater circuit connected to the condenser, a compressor in the return circuit, between the evaporator and condenser, actuated by flow of gas from the heater circuit, and a circulation pump in the heater circuit, driven by said motor.

18. The method of refrigeration, comprising the expansion, in suitable apparatus, of liquid to vapor, the absorption of the vapor by exposing the same to a jet or jets of weak liquor, without removing the heat of absorption, the compression of the resulting solution by a jet of heated gas, the separation of gas therefrom, and the condensation of the gas so separated.

19. In a method of refrigeration involving the alternate expansion and condensation of an expansible and absorbable fluid the step of absorbing the vapor of the fluid, after its expansion, by exposing the same to jets of weak liquor, without removing the heat of absorption during and after said absorption and concentrating the solution after absorption by jets of heated gas.

20. In a method of refrigeration including the successive evaporation, absorption and condensation of an expansible fluid, the step of compressing the rich liquor, after absorption, by a jet or jets of heated gas.

21. The method of refrigeration, comprising evaporating a refrigerant, absorbing the vapor, at a pressure independent of that in the evaporator, and without removing the heat of absorption, by exposing the same to jets of weak liquor, compressing the resulting solution by injecting thereinto jets of heated gas, separating the weak liquor from the gas in said compressed solution, and condensing a part of the gas so separated, at a pressure independent of that of said compressed solution.

22. The method of refrigeration involving the circulation of an expansible refrigerant, comprising evaporating the refrigerant, absorbing the vapor at a pressure independent of that in the evaporator by exposing it to jets of a cooled absorbent, compressing the solution after absorption, without removing the heat of absorption and the heat of compression, separating the gaseous refrigerant from the liquid absorbent, after compression, at a pressure inferior to that in the condenser, heating a portion of the refrigerant to form gas of a pressure superior to that in the condenser, compressing said gaseous refrigerant by injecting thereinto said heated gas, and condensing the gaseous refrigerant so compressed.

23. In a process of refrigeration including the successive condensation, evaporation, absorption and separation, of an expansible fluid, the method of compressing the gas separated from the absorbent, comprising circulating a portion of the condenser fluid through a heater, to form gas at a superior pressure, and injecting said gas into the gas separated from the absorbent prior to the condensation thereof.

24. The process of refrigeration comprising evaporating a fluid refrigerant, absorbing a portion of the vapor by exposing same to a jet or jets of weak liquor, compressing another portion of the vapor by mechanical means, compressing the solution resulting from said absorption by injecting thereinto said portion of the vapor compressed by mechanical means, and condensing gas liberated from the combined mixture so compressed.

25. The method of refrigeration comprising evaporating a fluid refrigerant, absorbing the same by jets of weak liquor, compressing the solution resulting from said absorption by jets of heated gas, separating the liquid and gaseous portions of said solution after said compression, cooling the liquid portion so separated to form said weak liquor, condensing a part of the gaseous portion so separated, conducting gas under pressure from the condenser to the jet compressor, and heating said gas by exposing same to the heat of the liquid portion so separated from said solution, prior to said cooling of said liquid portion.

26. In a refrigerating apparatus, the combination with a main circuit for the refrigerant, from and to the condenser, said circuit including a jet compressor for delivering gaseous refrigerant to the condenser, of a heater in circuit, with the condenser and supplying high pressure gas to said compressor, and a jet-pump in the heater circuit, operated by said pressure gas from said heater, for injecting liquid fluid from the condenser into said heater.

27. The process of refrigeration, comprising evaporation of fluid refrigerant, absorbing a portion of the vapor at a pressure independent of that in the evaporator, by exposing the same to a jet or jets of cooled weak liquor, without removing the heat of absorption, compressing another portion of the vapor by mechanical means, compressing a portion of the solution resulting from the absorption of said absorbed portion of the vapor in weak liquor by injecting thereinto said portion of the vapor compressed by mechanical means, compressing another portion of the solution resulting from the absorption of said absorbed portion of the vapor in weak liquor by injecting thereinto jets of superheated gas, and condensing the gas liberated from the combined mixture of all portions so compressed.

28. In a method of refrigeration involving the alternate expansion and condensation of an expansible fluid, the step of absorbing the vapor of the fluid, after its expansion, by jets of cooled weak liquor, and concentrating the solution of fluid in absorbent, so produced by jets of gas, independently of the pressure in the evaporator.

29. In a method of refrigeration involving the alternate expansion and condensation of an expansible fluid, the step of compressing the rich liquor, containing the heat of absorption, after absorption, by jets of heated fluid gas.

30. In a method of refrigeration including the successive evaporation, absorption, compression of gas, and condensation of an expansible fluid, the step of dissociating the gas from the absorbent by the application thereto of the heat of absorption and heat of the heated gas.

31. In a method of refrigeration including the successive evaporation, absorption, dissociation and condensation of an expansible fluid, the step of dissociating the fluid gas from the absorbent in proportions independent of the pressure in the condenser by the action of jets of fluid gas.

32. In a method of refrigeration involving the alternate expansion and condensation of an expansible fluid, the successive steps of evaporating the liquid fluid, absorbing the vapor so formed in proportions independent of the pressure in the evaporator, retaining within the solution of vapor in absorbent so formed the heat of absorption, compressing said solution by injecting thereinto heated gas, dissociating the solution so compressed into gas and absorbent in proportions independent of the pressure in the condenser, by the combined heat of absorption and heat of compression, cooling the liquor so dissociated, compressing the gas so dissociated by heated fluid of superior pressure, liquefying a part of the gas so compressed, at a pressure inferior to that of said heated gas, and superior to that of said dissociated gas, and heating another part of the gas so compressed, at condenser pressure, by the liquor so dissociated, for compressing said solution after absorption.

In testimony whereof, I affix my signature in presence of two witnesses.

JOHN C. BERTSCH.

Witnesses:
H. C. McCrady,
Wm. F. McCrady.